US007477977B2

(12) United States Patent
Nishimura et al.

(10) Patent No.: US 7,477,977 B2
(45) Date of Patent: Jan. 13, 2009

(54) POWER WINDOW DEVICE

(75) Inventors: Kozo Nishimura, Aichi (JP); Akira Ogino, Toyota (JP); Seiichi Watanabe, Aichi-ken (JP); Takashi Kikuta, Kariya (JP); Yukio Isomura, Chita (JP)

(73) Assignees: Kabushiki Kaisha Tokai Rika Denki Seisakusho, Aichi (JP); Aisin Seiki Kabushiki Kaisha, Aichi-ken (JP)

( * ) Notice: Subject to any disclaimer, the term of this patent is extended or adjusted under 35 U.S.C. 154(b) by 460 days.

(21) Appl. No.: 11/400,725

(22) Filed: Apr. 7, 2006

(65) Prior Publication Data

US 2006/0229781 A1 Oct. 12, 2006

(30) Foreign Application Priority Data

Apr. 8, 2005 (JP) ............................ 2005-112449

(51) Int. Cl.
*B60J 1/17* (2006.01)
*B62D 65/06* (2006.01)

(52) U.S. Cl. ........................................................ 701/49

(58) Field of Classification Search .................... 701/49
See application file for complete search history.

(56) References Cited

U.S. PATENT DOCUMENTS

2005/0099263 A1* 5/2005 Ikeda ........................ 340/5.62
2006/0173585 A1* 8/2006 Hanzawa ........................ 701/1
2006/0229781 A1* 10/2006 Nishimura et al. ............ 701/36
2007/0062753 A1* 3/2007 Yoshida et al. .............. 180/333
2007/0294006 A1* 12/2007 Noro ........................... 701/36

FOREIGN PATENT DOCUMENTS

JP 10-153046 6/1998

* cited by examiner

*Primary Examiner*—Thomas G Black
*Assistant Examiner*—Shelley Chen
(74) *Attorney, Agent, or Firm*—Patterson, Thuente, Skaar & Christensen, P.A.

(57) ABSTRACT

A power window device for use in a vehicle for raising and lowering each window glass. The power window device includes a drive unit for each door operable for raising and lowering the associated window glass. Each drive unit includes an EEPROM for retaining mounting position information of the position in the vehicle at which the window glass driven by the associated drive unit is located. A processor in each drive unit retrieves steering wheel position information of whether the steering wheel is located in the right or left side of the vehicle. The processor recognizes the position in the vehicle at which the associated drive unit is installed based on the mounting position information and the steering wheel information. This enables the drive unit to be used for both right hand and left hand drive vehicles.

13 Claims, 3 Drawing Sheets

| Door / Terminal | Front Right Door | | Front Left Door | |
|---|---|---|---|---|
| | For Driver (Right Hand Drive Vehicle Driver Door ECU) | For Passenger (Right Hand Drive Vehicle Passenger Door ECU) | For Driver (Left Hand Drive Vehicle Driver Door ECU) | For Passenger (Left Hand Drive Vehicle Passenger Door ECU) |
| 58 | X | X | O | X |
| 59 | X | O | X | X |
| 60 | X | X | X | O |

POWER WINDOW DEVICE

CROSS-REFERENCE TO RELATED APPLICATIONS

This application is based upon and claims the benefit of priority from prior Japanese Patent Application No. 2005-112449, filed on Apr. 8, 2005, the entire contents of which are incorporated herein by reference.

BACKGROUND OF THE INVENTION

The present invention relates to a power window device for automatically raising and lowering a window member by operating a switch.

In the prior art, a power window device is installed in a vehicle to facilitate the raising and lowering of door window glasses (opening and closing of door windows). For each door of a vehicle, the power window device includes a window switch, which is operated by a vehicle occupant when lowering or raising the window glass of the door, and a drive source, such as a DC motor, for lowering or raising the window glass. When a window switch is operated, the associated motor is driven to produce rotation that lowers or raises the corresponding window glass.

FIG. 4 is a block diagram showing a typical example of power window device 51. The power window device 51 is provided with a remote control function enabling the raising and lowering of the window glasses from the driver's seat. More specifically, a remote switch unit 52 is installed in the door adjacent the driver's seat. The switch unit 52 includes power window (PW) switches 52*a* to 52*d* for the window glasses associated with the driver door, the front passenger door, the rear right door, and the rear left door, respectively. Additionally, the driver door, the front passenger door, the rear right door, and the rear left door respectively include PW switches 53*a* to 53*d*, which are exclusively provided for each door.

The power window device 51 also includes a plurality of motor units 54 for respectively raising and lowering corresponding window glasses based on the operation of the associated PW switches 52*a* to 52*d* and 53*a* to 53*d*. In this example, there are four motor units 54*a* to 54*d*, which are respectively for the driver door, front passenger door, rear right door, and rear left door. The motor units 54*a* to 54*d* each include an electric control unit (ECU) 55 and a motor 56. The driver door ECU 55*a*, front passenger door ECU 55*b*, rear right door ECU 55*c*, and rear left door ECU 55*d* are connected to the switch unit 52 by a signal line 57.

A window control program, which is executed when opening and closing the associated window glass, is written to each of the ECUs 55*a* to 55*d*. The window control program includes identification information for recognizing the associated vehicle door. For example, the window control program written to the driver door ECU 55*a* includes identification information, or data, indicating that the ECU 55*a* is associated with the driver door. The front passenger door ECU 55*b*, the rear right door ECU 55*c*, and the rear left door ECU 55*d* includes the same kind of data.

When any of the PW switches 52*a* to 52*d* are operated, the switch unit 52 outputs an operation signal St to the signal line 57. For example, when the driver door PW switch 52*a* is operated, the switch unit 52 outputs a driver door switch operation signal Sta, which indicates such switch operation, to the signal line 57. Then, the operation signal Sta is input to the ECUs 55*a* to 55*d*. As a result, the ECU associated with the operation signal Sta (in this case, the ECU 55*a*) starts to function and executes control for raising and lowering the corresponding window glass.

A regulator is connected to each motor unit 54. The motor unit 54 is then attached to the associated vehicle door. However, the left and right doors are symmetric to each other. Thus, the part of the door to which the motor unit 54 is attached differs between doors. Accordingly, a left vehicle door and a right vehicle door use different motor units 54. In other words, the same motor unit 54 cannot be used for both left and right vehicle doors.

The steering wheel of a vehicle is located on the right side or left side in accordance with the vehicle standard of each country. For a right hand drive vehicle, the front right door is the driver door, and the front left door is the passenger door. For a left hand drive vehicle, the front right door is the passenger door, and the front left door is the driver door. Accordingly, four types of motor units 54 are necessary to manufacture the same type of vehicle driven on different sides. That is, motor units for a right driver door, a right passenger door, a left driver door, and a left passenger door are necessary. The identification information of the window control program includes the type of the associated motor unit 54. The different types of motor units 54 required for right and left hand drive vehicles increases the number of components and raises manufacturing costs.

Accordingly, Japanese Laid-Open Patent Publication No. 10-153046 describes a microcomputer for solving the above problem. The microcomputer (corresponding to the ECUs 55 of FIG. 1), which controls the power window device, may be used for both right and left hand drive vehicles. The microcomputer, which drives a motor, is connected to a control mode switch for switching the control mode of the microcomputer. The control mode switch is activated or inactivated in accordance with whether the power window device is for a right hand drive vehicle or a left hand drive vehicle.

However, the microcomputer of Japanese Laid-Open Patent Publication No. 10-153046 requires the control mode switch to switch the control mode. This enlarges the ECU 55 which, in turn, would enlarge the motor unit 54 and the power window device 51. Further, to switch the control mode of the microcomputer, switching must be performed with the control mode switch. Such tasks are burdensome.

To solve this problem, terminals may be added to a connector of each of the ECUs 55*a* to 55*d* (i.e., motor units 54*a* to 54*d*). In this case, a matrix indicating connections between the signal line 57 (harness) and the ECU terminals is used to enable recognition of the vehicle door to which the motor unit is attached. Referring to FIG. 5, each of the ECUs 55*a* to 55*d* includes a plurality of door recognition terminals 58 to 60. The door recognition terminal that is to be connected to the signal line 57 is determined in accordance with the door in which the ECU is installed. The door recognition terminal 58 to 60 that is connected to the signal line 57 is grounded. Each of the ECUs 55*a* to 55*d* checks the grounded terminal 58 to 60 to recognize the associated door.

The chart of FIG. 5 shows an example of the connection matrix. In a driver door ECU for a right hand drive vehicle, the signal line 57 is not connected to any of the door recognition terminals 58 to 60. In a passenger door ECU for a right hand vehicle, the signal line 57 is connected to the door recognition terminal 59. In a driver door ECU for a left hand drive vehicle, the signal line 57 is connected to the door recognition terminal 58. In a passenger door ECU for a left hand vehicle, the signal line 57 is connected to the door recognition terminal 60.

However, when using the connection matrix for the signal line 57, a further signal line 57 for connection with the terminals 58 to 60 must be prepared. This increases the signal line weight (harness weight) and hinders reduction in size and cost of the motor unit 54. Further, terminals that can be used as the door recognition terminals 58 to 60 are necessary. This may result in the need for adding the door recognition terminals 58 to 60 to the ECUs 55*a* to 55*d* or preparation of different ECUs having a large quantity of terminals. As a result, costs would be increased and re-designing of the ECU would become necessary.

SUMMARY OF THE INVENTION

The present invention provides a power window device enabling the same motor unit to be used for right hand and left hand drive vehicles with a reduced number of components and without the need for switching control modes of the motor unit.

One aspect of the present invention is a power window device for use in a vehicle including a steering wheel and a plurality of doors. Each door has a window member. The power window device is for raising and lowering each window member. The power window device includes a plurality of drive units respectively mountable in the plurality of doors and operable for raising and lowering the associated window members. Each drive unit of the plurality includes a memory device for retaining mounting position information of a position in the vehicle at which the window member driven by the associated drive unit is located. A processor, connected to the memory device, retrieves steering wheel position information of whether the steering wheel is located on the right or left side of the vehicle. The processor recognizes the position in the vehicle at which the associated drive unit is installed based on the mounting position information and the steering wheel information.

A further aspect of the present invention is a method for installing a power window device in a vehicle including a steering wheel and a plurality of doors. Each door includes a window member. The power window device is for raising and lowering each window member. The method includes mounting a plurality of drive units respectively on the plurality of doors for operating for raising and lowering the associated window members, preparing memory devices respectively for the plurality of drive units, and retaining mounting position information, in each of the memory devices, of a position in the vehicle at which the window member driven by the associated drive unit is located. The method further includes preparing a plurality of processors connected to the associated memory devices respectively for the plurality of drive units, retrieving steering wheel position information, with each of the processors, of whether the steering wheel is located on the right or left side of the vehicle, and recognizing the position in the vehicle at which the associated drive unit is installed with each of the processors based on the mounting position information and the steering wheel information.

Other aspects and advantages of the present will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of the present invention will now be described with reference to FIGS. 1 to 3.

Figure 1:
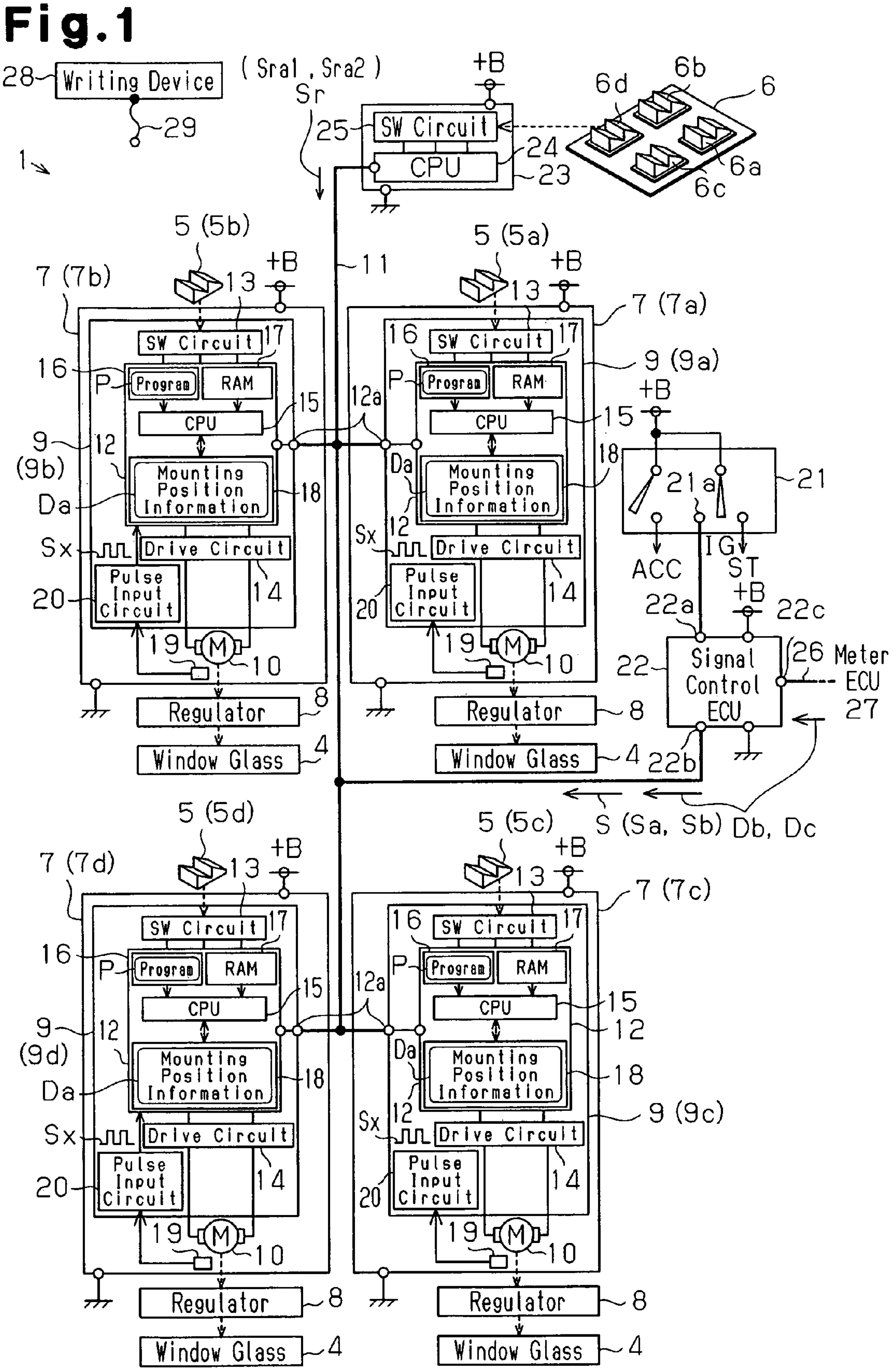
FIG. 1 is a schematic diagram showing a power window device according to a preferred embodiment of the present invention.
Figure 2:
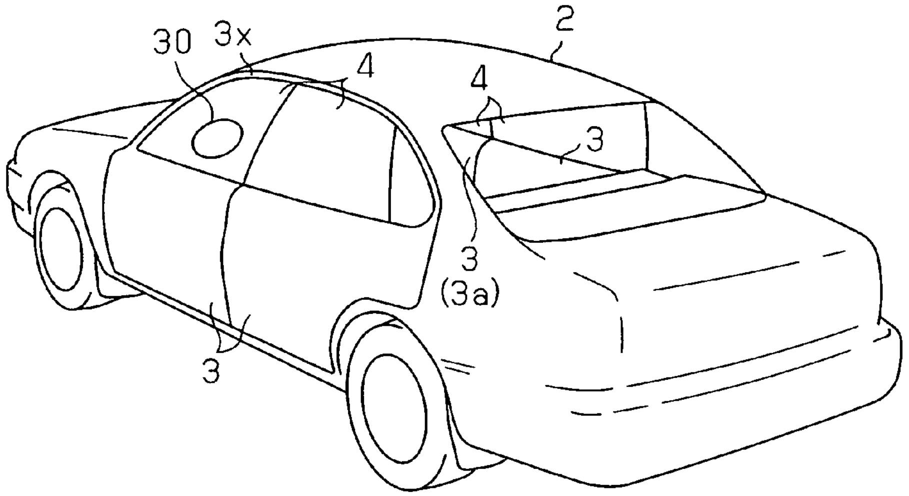
FIG. 2 is a perspective view taken from the rear of a vehicle.

FIG. 1 is a schematic diagram showing the power window device 1. The power window device 1 uses motor drive force to automatically raise and lower window glasses 4 (window members) installed in side doors 3 (vehicle doors) of a vehicle 2. A door power window (PW) switch 5 is installed in each side door 3 for exclusively raising and lowering the associated window glass 4. In the preferred embodiment, the door PW switches 5 include a front right door PW switch 5*a*, a front left door PW switch 5*b*, a rear right door PW switch 5*c*, and a rear left door PW switch 5*d*.

If the vehicle 2 is a right hand drive vehicle, remote PW switches 6 are arranged in the front right door (i.e., driver door) so that the raising and lowering of each of the window glasses 4 may be remotely controlled by the driver. The remote PW switches 6 includes a driver door PW switch 6*a*, a passenger door PW switch 6*b*, a rear right PW switch 6*c*, and a rear left PW switch 6*d*.

The PW switches S and 6 are provided with functions for lowering, raising, automatically lowering, and automatically raising the corresponding window glasses 4. More specifically, the PW switches 5 and 6 are two-step click type tilt switches, which are pushed one step toward one side (lowering side) to lower the corresponding window glass 4 and pushed one step toward the other side (raising side) to raise the corresponding window glasses 4. The PW switches 5 and 6 are also pushed two steps toward either the lowering side or the raising side. This continuously lowers or raises the corresponding window glasses 4 in an automatic state until the window glasses 4 reach a fully closed or open position or until the PW switches 5 and 6 are operated again.

In each side door 3 of the vehicle 2, the power window device 1 includes a motor unit 7 (drive unit) and a regulator 8. The motor unit 7 raises and lowers the associated window glass 4 in accordance with the operation of the corresponding door PW switch 5 or remote PW switch 6. The regulator 8 regulates the operation of the associated motor unit 7. In the preferred embodiment, there are four motor units 7, a front right door motor unit 7*a*, a front left door motor unit 7*b*, a rear right door motor unit 7*c*, and a rear left door motor unit 7*d*.

Each motor unit 7 includes an ECU 9, which controls the motor unit 7, and a motor 10, which functions as a drive source for raising and lowering the associated window glass 4. The ECU 9 and the motor 10 are unitized to form the motor unit 7. The ECUs 9 include a front right door ECU 9*a*, a front right door ECU 9*b*, a rear right door ECU 9*c*, and a rear left door ECU 9*d*. The ECUs 9*a* to 9*d* of the motor units 7*a* to 7*d* are connected to one another by a signal line 11.

Each motor 10, which may be a DC motor, generates rotation, or motor torque. The corresponding regulator 8 converts the motor torque to vertical linear movement so as to raise and lower the associated window glass 4. When the motor 10 produces normal rotation, the regulator 8 converts the motor torque to downward linear movement and lowers the window glass 4. When the motor 10 produces reverse rotation, the regulator 8 converts the motor torque to upward linear movement and raises the window glass 4.

Each of the ECUs 9*a* to 9*d* includes a controller 12 that is formed by a microcomputer having various devices, a switch circuit 13 for outputting an electric signal indicating the state of the associated one of the door PW switches 5*a* to 5*d*, and a drive circuit 14 for driving the associated motor 10 in accordance with a command from the controller 12. The controller 12 includes a central processing unit (CPU) 15 (processor), a read only memory (ROM) 16, a random access memory (RAM) 17, and an electrically erasable programmable read only memory (EEPROM) 18. The EEPROM 18 is a non-volatile memory.

The ROM 16 stores a window control program P that is executed when the associated window glass 4 is lowered or raised. When the corresponding door PW switch 5 or remote PW switch 6 is operated to raise the window glass 4, the control program P is executed to have the motor 10 produce rotation in one direction at a predetermined speed and raise the window glass 4. When the corresponding door PW switch 5 or remote PW switch 6 is operated to lower the window glass 4, the control program P is executed to have the motor 10 produce rotation in the other direction at a predetermined speed and lower the window glass 4. The CPU 15 controls the corresponding ECU 9 in a centralized manner and executes the window control program P stored in the ROM 16 to control the lowering or raising of the window glass 4.

The ECUs 9*a* to 9*d* drive the corresponding motor 10 when the corresponding one of the door PW switches 5*a* to 5*d* is operated to lower or raise the associated window glass 4. For example, when the front right door PW switch 5*a* is operated, the CPU 15 of the front right door ECU 9*a* drives the corresponding motor 10 with the drive circuit 14 to raise or lower the window glass of the front right door. The same actions occur when the front left door PW switch 5*b*, the rear right door PW switch 5*c*, and the rear left door PW switch 5*d* are operated.

The window control program P includes an entrapment prevention process for preventing entrapment of an object, such as a vehicle occupant's finger, between the window glass 4 and window frame 3*x* (refer to FIG. 2) when closing the window. If an object is determined to be entrapped when the window glass 4 is being raised, the entrapment prevention process stops the window glass 4 or starts to move the window glass 4 in the opposite direction. Each CPU 15 executes the entrapment prevention process when the corresponding window glass 4 is being raised.

The entrapment prevention process will now be described in more detail. The power window device 1 includes a pulse sensor 19 for each motor 10 to detect the speed of the rotation produced by the motor 10. Each pulse sensor 19 is connected to the corresponding controller 12 by a pulse input circuit 20. The pulse sensor 19 sends a pulse signal Sx, which is in accordance with the detected rotation speed of the motor 10, via the pulse input circuit 20 to the controller 12. Based on the received pulse signal Sx, the CPU 15 calculates the rotation speed of the motor 10 and determines the present position of the window glass 4.

In the preferred embodiment, the entrapment prevention process is performed based on the pulse signal Sx from the pulse sensor 19. More specifically, the pulse cycle of the pulse signal Sx is short when the rotation speed of the motor 10 is high and long when the rotation speed is low. This factor is used to determine entrapment of an object when the pulse cycle of the pulse signal Sx changes. The entrapment of an object between the window glass 4 and the window frame 3*x* restricts the raising of the window glass 4. This lengthens the cycle of the pulse signal Sx. When the pulse cycle becomes longer than a predetermined cycle, the CPU 15 determines that an object has been entrapped and starts to lower the window glass 4.

An engine switch 21 (ignition switch), which is operated when starting the engine, is arranged in a key cylinder near the steering wheel in the vehicle 2. A vehicle key (not shown) is inserted in the key cylinder and turned between an OFF position, an accessory (ACC) position, an ignition (JG) position, and a START position. The engine switch 21 outputs a switch signal that is in accordance with these four operation positions. The OFF position is where the vehicle key may be inserted in and removed from the key cylinder. The ACC position is where the key is located when using an accessory, such as the radio, without having to operate the engine. The IG position is where the key is located when the vehicle 2 is being driven. The START position is where the key is located when starting the engine.

The power window device 1 includes a signal control ECU 22 for enabling or disabling the operation of the motor units 7*a* to 7*d* based on the state of the engine switch 21. The signal control ECU 22 includes an input terminal 22*a* and an output terminal 22*b*. The input terminal 22*a* is connected to an IG terminal 21*a* of the engine switch 21. The output terminal 22*b* is connected to the ECUs 9*a* to 9*d* of the motor units 7*a* to 7*d* via the signal line 11.

The signal control ECU 22 sends a control signal S, which indicates the state of the engine switch 21, to the motor units 7*a* to 7*d*. For example, the signal control ECU 22 outputs an enablement signal Sa as the control signal S to enable the raising and lowering of the window glasses 4 when the engine switch 21 is located at the IG position. Further, the signal control ECU 22 outputs a disablement signal Sb as the control signal S to disable the raising and lowering of the window glasses 4 when the engine switch 21 is located at other positions.

The operation of each of the motor units 7*a* to 7*d* (i.e., ECUs 9*a* to 9*d*) is enabled or disabled in accordance with the enablement signal Sa or disablement signal Sb, which is received by the input terminal 12*a*. More specifically, when each CPU 15 receives the enablement signal Sa from the signal control ECU 22, the CPU 15 enables the raising and lowering of the associated window glass 4 with the corresponding door PW switch 5 or remote PW switch 6. When the CPU 15 receives the disablement signal Sb from the signal control ECU 22, the CPU 15 disables the raising and lowering of the associated window glass 4 with the corresponding door PW switch 5 or remote PW switch 6. Accordingly, as long as the engine switch 21 is located at the IG position, the raising and lowering of each window glass 4 is enabled. When the engine switch 21 is located at other positions, the raising and lowering of each window glass 4 is disabled.

The power window device 1 includes a switch control unit 23 for outputting a signal, which is in accordance with the state of the remote PW switches 6. The switch control unit 23 includes a CPU 24 and a switch circuit 25. The CPU 24 controls the switch control unit 23. The switch circuit 25 provides the CPU 24 with an electric signal indicating the state of the remote PW switches 6. The CPU 24 is electrically connected to the motor units 7*a* to 7*d* via the signal line 11.

In the switch control unit 23, the CPU 24 monitors the state of the remote PW switches 6 and provides the motor units 7*a* to 7*d* with a remote SW operation signal Sr, which is in accordance with the switch state, via the signal line 11. For example, when the CPU 24 determines that the driver door PW switch 6*a* has undergone a lowering operation, the CPU 24 accordingly sends a driver door SW lowering operation signal Sra1 to the motor units 7*a* to 7*d*. When determining that the driver door PW switch 6*a* has undergone a raising operation, the CPU 24 accordingly sends a driver door SW raising operation signal Sra2 to the motor units 7*a* to 7*d*.

Mounting position information Da is written to the EEPROM 18 of each of the motor units 7*a* to 7*d*. The mounting position information Da is used when determining the door associated with each of the motor units 7*a* to 7*d*. That is, the mounting position information Da indicates whether the associated door is the driver door, the passenger door, the rear right door, or the rear left door. For a right hand drive vehicle, the front right door is the driver door and the front left door is the passenger door. For a left hand drive vehicle, the front left door is the driver door and the front right door is the passenger door.

In the preferred embodiment, the mounting position information Da written to the EEPROM 18 indicates a position in the vehicle, that is, the front left side, front right side, rear left side, and rear right side of the vehicle 2. For example, the mounting position information Da written to the EEPROM 18 of the front right door motor unit 7*a* indicates the front right side of the vehicle 2. The mounting position information Da written to the EEPROM 18 of the front left door motor unit 7*b* indicates the front left side of the vehicle 2. The mounting position information Da written to the EEPROM 18 of the rear right door motor unit 7*c* indicates the rear right side of the vehicle 2. The mounting position information Da written to the EEPROM 18 of the rear left door motor unit 7*d* indicates the rear left side of the vehicle 2.

An in-vehicle communication line 26 (in-vehicle local area network) for electrically connecting vehicle devices (e.g., power supply ECU and meter ECU) is laid out in the vehicle 2. The signal control ECU 22 includes a communication terminal 22*c* connected to a meter ECU 27. The meter ECU 27 is an ECU for controlling various meters (not shown) located in the instrument panel, such as a speedometer, a tachometer, a coolant temperature meter, and a fuel meter.

The meter ECU 27 constantly or intermittently outputs steering wheel position information Db, which is used to determine the doors associated with the motor units 7*a* to 7*d*. The steering wheel position information Db is information indicating whether the steering wheel 30 (FIG. 30) of the vehicle 2 is located on the right hand side or left side of the vehicle. Whenever receiving the steering wheel position information Db from the meter ECU 27, the signal control ECU 22 outputs the steering wheel position information Db to the signal line 11. The steering wheel position information Db is then received by the motor units 7. Each motor unit 7 receives the steering wheel position information Db when it is attached to the associated side door 3 and connected to the signal line 11.

The window control program P includes an associated door recognition process for determining the door of the vehicle 2 to which each of the motor units 7*a* to 7*d* is associated. The associated door recognition process is executed to recognize the door associated with each of the motor units 7*a* to 7*d* based on the mounting position information Da written to each EEPROM 18 and the steering wheel position information Db retrieved from the meter ECU 27. Each CPU 15 of the motor units 7*a* to 7*d* executes the associated door recognition process when receiving the steering wheel position information Db to determine and recognize the door associated with the CPU 15 (i.e., the motor units 7*a* to 7*d*).

The EEPROM 18 of the front right door motor unit 7*a* stores the mounting position information Da, which indicates that it is located at the front right side of the vehicle 2. When the front right door motor unit 7*a* receives steering wheel position information Db indicating that the steering wheel 30 is located at the right side of the vehicle 2, the front right door motor unit 7*a* determines that the associated door is the driver door based on the two pieces of information Da and Db. When the front right door motor unit 7*a* receives steering wheel position information Db indicating that the steering wheel 30 is located at the left side of the vehicle 2, the front right door motor unit 7*a* determines that the associated door is the passenger door based on the steering wheel position information Da and the mounting position information Db, which is stored in the EEPROM 18.

Further, the EEPROM 18 of the front left door motor unit 7*b* stores the mounting position information Da, which indicates that it is located at the front left side of the vehicle 2. When the front left door motor unit 7*b* receives steering wheel position information Db indicating that the steering wheel 30 is located at the right side of the vehicle 2, the front left door motor unit 7*b* determines that the associated door is the passenger door based on the two pieces of information Da and Db. When the front left door motor unit 7*b* receives steering wheel position information Db indicating that the steering wheel 30 is located at the left side of the vehicle 2, the front left door motor unit 7*b* determines that the associated door is the driver door based on the steering wheel position information Da and the mounting position information Db, which is stored in the EEPROM 18.

Accordingly, in a right hand drive vehicle, the front right door motor unit 7*a* behaves as a driver door motor unit and the front left door motor unit 7*b* behaves as a passenger door motor unit. In a left hand drive vehicle, the front right door motor unit 7*a* behaves as a passenger door motor unit and the front left door motor unit 7*b* behaves as a driver door motor unit. The rear right door motor unit 7*c* and the rear left door motor unit 7*d* are irrelevant to whether the steering wheel 30 is located on the right side or left side of the vehicle 2.

The procedures for installing the motor units 7*a* to 7*d* in the vehicle 2 will now be discussed.

Figure 3:
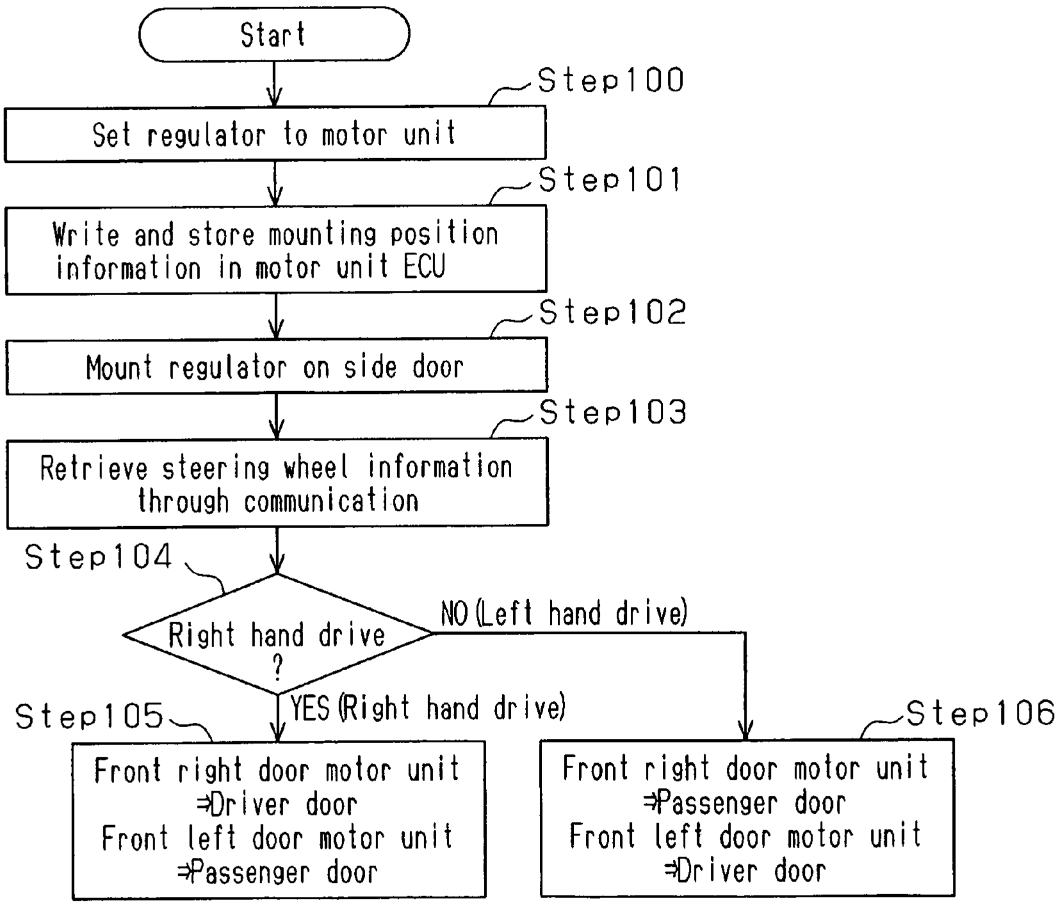
FIG. 3 is a flowchart showing the procedures for recognizing the door on which a motor unit has been mounted.

FIG. 3 is a flowchart showing the procedures for installing the motor units 7*a* to 7*d* in the vehicle 2 and determining the associated door. The regulator 8 is first set on the motor unit 7 (step 100). This setting is performed for each of the motor units 7*a* to 7*d*. Thus, an assembly of the motor unit 7 and the regulator 8 is prepared for each of the front right door, the front left door, the rear right door, and the rear left door. Accordingly, there are a total of four assemblies.

Then, the mounting position information Da is written to the EEPROM 18 of each of the motor units 7*a* to 7*d* (step 101). The writing is performed in the following manner. The input terminal 12*a* of each of the motor units 7*a* to 7*d* (i.e., ECUs 9*a* to 9*d*) are connectable to an external writing device 28. The writing device 28 includes, for example, an input device, a controller, a computer, a main memory, a display, and an interface (none shown). The interface of the writing device 28 is connected to one end of a communication cable 29, and the other end of the communication cable 29 is connected to the input terminal 12*a* of each of the motor units 7*a* to 7*d*.

The input device of the writing device 28 is operated to input the mounting position information Da to the writing device 28 while viewing the display. After all of the necessary data is input, the input device is used to perform a transmission operation. This transmits the mounting position information Da to the motor unit 7 through the communication cable 29 and writes the mounting position information Da to the EEPROM 18. The writing is performed four times in the preferred embodiment, once for each one of the four motor units 7*a* to 7*d*.

Subsequently, each regulator 8, to which the motor unit 7 is attached, is mounted on the associated side door 3 (step 102). More specifically, the regulator 8 attached to the motor unit 7*a* is mounted on the front right door, the regulator attached to the motor unit 7*b* is mounted on the front left door, the regulator 8 attached to the motor unit 7*c* is mounted on the rear right door, and the regulator 8 attached to the motor unit 7*d* is mounted on the rear left door.

After the mounting of the motor units 7 and the assembling of the vehicle 2 are completed, the signal control ECU 22 sends the steering wheel position information Db to the motor units 7*a* to 7*d* via the signal line 11 (step 103). If the vehicle 2 is a right hand drive vehicle, the steering information Db indicates so. If the vehicle 2 is a left hand drive vehicle, the steering information Db indicates so.

Then, the ECUs 9*a* to 9*d* of the motor units 7*a* to 7*d* determine whether the vehicle 2 is a right hand drive or left hand drive vehicle based on the steering wheel position information Db (step 104). When determining that the vehicle 2 is a right hand drive vehicle, the ECUs 9*a* to 9*d* proceed to step 105. When determining that the vehicle 2 is a left hand drive vehicle, the ECUs 9*a* to 9*d* proceed to step 106.

The ECU 9*a* of the front right door motor unit 7*a* recognizes that it is associated with the front right door from the mounting position information Da stored in the EEPROM 18. Thus, when receiving steering wheel position information Db indicating that the vehicle 2 is a right hand drive vehicle, the ECU 9*a* determines that it is associated with the driver door (step 105). The ECU 9*b* of the front left door motor unit 7*a* recognizes that it is associated with the front left door from the mounting position information Da. Thus, when receiving steering wheel position information Db indicating that the vehicle 2 is a right hand drive vehicle, the ECU 9*b* determines that it is associated with the passenger door (step 105).

In the same manner, when receiving steering wheel position information Db indicating that the vehicle is a left hand drive vehicle, the ECU 9*a* of the front right door motor unit 7*a* determines that it is associated with the passenger door based on the mounting position information Da and the steering wheel position information Db (step 106). When receiving steering wheel position information Db indicating that the vehicle is a left hand drive vehicle, the ECU 9*b* of the front left door motor unit 7*b* determines that it is associated with the driver door based on the mounting position information Da and the steering wheel position information Db (step 106).

Accordingly, the front right door motor unit 7*a* and the front left door motor unit 7*b* may be used in both right hand and left hand drive vehicles. If the motor units 7*a* and 7*b* could not be used in both right hand and left hand drive vehicles, four types of motor units would be necessary for the front doors. The four types would be a driver door motor unit for a right hand drive vehicle, a passenger door motor unit for a right hand drive vehicle, a driver door motor unit for a left hand drive vehicle, and a passenger door motor unit for a left hand drive vehicle. However, since the motor units 7*a* and 7*b* of the preferred embodiment may be used for both right hand and left hand drive vehicles, only two types of motor units are necessary. This reduces components and decreases manufacturing costs.

Further, when employing the technique described in Japanese Laid-Open Patent Publication No. 10-153046 so that the motor unit 7 may be used in a common manner, a switch is necessary for switching between a right hand drive vehicle control mode and a left hand drive vehicle control mode. However, such a switch becomes unnecessary with the preferred embodiment. This decreases the number of components required for the power window device 1 and enables reduction is size of the power window device 1. Further, when employing the above switch, the control mode of the motor unit 7 must be switched. However, with the preferred embodiment, such switching becomes unnecessary and the mounting of the motor units 7 in the vehicle 2 is facilitated.

Figures 4, 5:
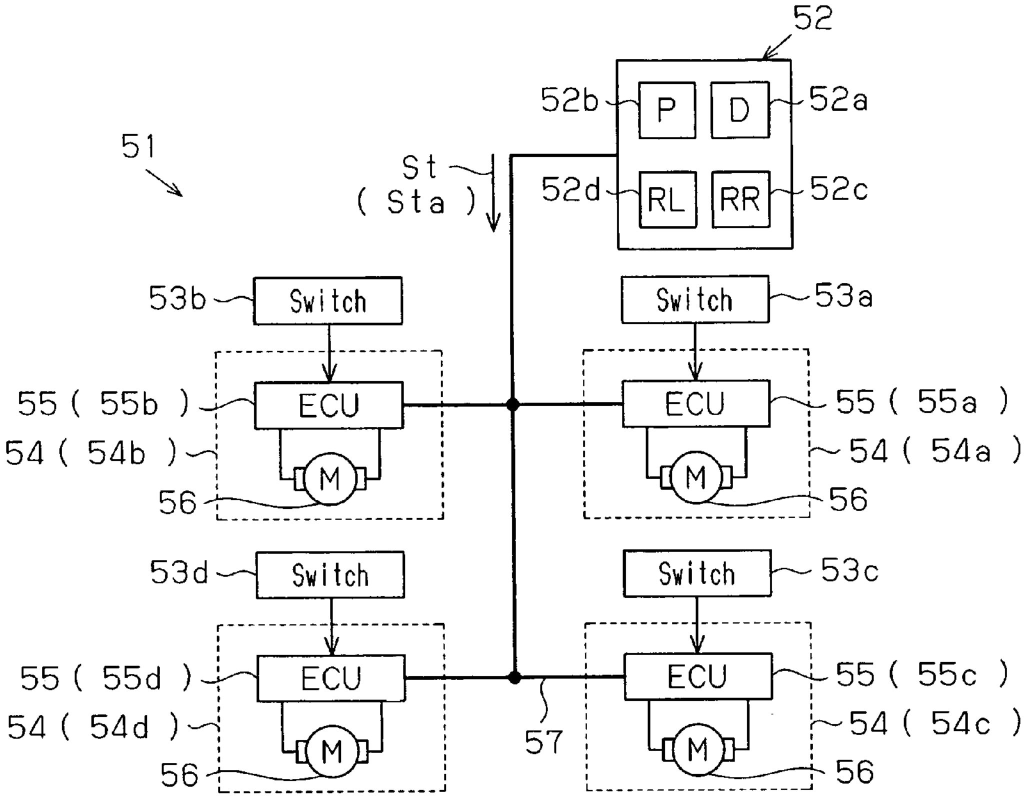
Fig.4 (Prior Art)
Fig.5 (Prior Art)
FIG. 4 is a block diagram showing a power window device of the prior art.
FIG. 5 is a chart showing a harness connection matrix used for door recognition.

Further, when employing the technique of FIG. 5 so that the motor unit 7 may be used in a common manner, door recognition terminals must be prepared for the motor units 7 (i.e., ECUs 9). A harness connected to the terminals must also be prepared. This would increase the harness weight and raise costs. Further, the additional terminals may enlarge the motor units 7. However, the preferred embodiment does not use door recognition terminals. This eliminates the need for a harness. Thus, a problem in which the harness weight increases does not occur. Further, the door recognition terminals are not necessary. This enables reduction in size of the motor units 7 (ECUs 9).

The preferred embodiment has the advantages described below.

(1) Each motor unit 7 includes an EEPROM 18. The mounting position information Da is written to the EEPROM 18 before the motor unit 7 is installed in the vehicle 2. The steering wheel position information Db is then retrieved after the motor unit 7 is installed in the vehicle 2. Then, the motor unit 7 recognizes the associated door based on the mounting position information Da and the steering wheel position information Db. Accordingly, the front right door motor unit 7*a* and the front left door motor unit 7*b* may commonly be used for right hand drive vehicles and left hand drive vehicles. This decreases the number of components and lowers the manufacturing cost. Further, the motor unit 7 may commonly be used for a right hand drive vehicle and a left hand drive vehicle without a switch for switching between modes for right hand and left hand drive vehicles. This further decreases the number of components and enables reduction in size of the motor unit 7. Further, mode switching does not have to be performed with a switch. In addition, the motor unit 7 (ECU 9) does not require door recognition terminals when used commonly for right hand and left hand drive vehicles. Thus, the harness weight does not have to be increased, the motor unit 7 does not have to be enlarged, and terminals do not have to be added.

(2) The writing device 28 is used to write the mounting position information Da to each EEPROM 18 before the motor units 7 are installed in the vehicle 2. Thus, the motor units 7 are identical products before the mounting position information Da is written to the EEPROM 18. Accordingly, the motor units 7 may be manufactured together along the same manufacturing line before the mounting position information Da is written to the EEPROM 18. Therefore, if the motor units 7 are manufactured together with EEPROMs 18 that do not contain data, and the mounting position information Da is written to the EEPROMs 18 before the motor units 7 are installed in the vehicle 2, the manufacturing efficiency of the motor units 7 may be improved.

(3) The steering wheel position information Db, which is necessary when determining the door associated with each motor unit 7, is retrieved through in-vehicle communication after the motor unit 7 is mounted on a side door 3. The steering wheel information Db may also be written to a non-volatile memory, such as the EEPROM 18, by an operator after the motor unit 7 is mounted on a side door 3. However, such writing would be burdensome. In the preferred embodiment, the steering wheel position information Db is provided to each motor unit 7 without an operator having to be involved with the writing. This reduces the assembling work when installing the motor units 7 in the vehicle 2.

(4) When each window glass 4 is closed, the ECU 9 (motor unit 7) performs entrapment prevention control to prevent entrapment of objects between the window glass 4 and the window frame 3*x*.

(5) The raising and lowering of each window glass 4 is enabled when the engine switch 21 is located at the IG position and disabled when the engine switch 21 is located at other positions. This prevents unexpected closing and opening of the window glasses.

It should be apparent to those skilled in the art that the present invention may be embodied in many other specific forms without departing from the spirit or scope of the invention. Particularly, it should be understood that the present invention may be embodied in the following forms.

The window control program may be set in accordance with the destination to which the vehicle 2 is shipped. In such a case, a plurality of window control programs P may be written to each ROM 16 in accordance with the shipping destination (e.g., shipped country, vehicle type). The signal control ECU 22 then sends the shipping destination information Dc (refer to FIG. 1) of the vehicle 2 via the signal line 11 to the motor units 7*a* to 7*d*. Each motor unit 7 refers to the shipping destination information Dc to acknowledge the shipping destination of the vehicle 2, selects one of the window control programs P written to the ROM 16 in accordance with the shipping destination, and uses the selected program. In this case, the window control program P that is in accordance with the shipping destination may be set.

The signal control ECU 22 does not have to constantly output the steering wheel position information Db. For example, the signal control ECU 22 may send the steering wheel position information Db to the motor units 7*a* to 7*d* when the engine switch 21 is located at the IG position.

The steering wheel position information Db does not necessarily have to provided to the motor units 7*a* to 7*d* through in-vehicle communication. For example, the steering wheel information Db may be written to a non-volatile memory such as the EEPROM 18 by the writing device 28

Each side door 3 may include more than one window glass 4.

The motor unit 7 and the regulator 8 do not have to be assembled together when installed in the vehicle 2 (side door 3). For example, the regulator 8 may first be mounted on a side door 3, and the motor unit 7 may then be mounted on the side door 3.

The present examples and embodiments are to be considered as illustrative and not restrictive, and the invention is not to be limited to the details given herein, but may be modified within the scope and equivalence of the appended claims.

What is claimed is:

1. A power window device for use in a vehicle including a steering wheel and a plurality of doors, with each door having a window member, wherein the power window device is for raising and lowering each window member, the power window device comprising:

a plurality of drive units respectively mountable in the plurality of doors and operable for raising and lowering the associated window members, each drive unit of the plurality including;

a memory device for retaining mounting position information of a position in the vehicle at which the window member driven by the associated drive unit is located; and a processor, connected to the memory device, for retrieving steering wheel position information of whether the steering wheel is located on the right or left side of the vehicle, the processor recognizing the position in the vehicle at which the associated drive unit is installed based on the mounting position information and the steering wheel information.

2. The power window device according to claim 1, wherein the memory device is a data writable non-volatile memory, and the mounting position information is written to the non-volatile memory by a writing device.

3. The power window device according to claim 2, wherein the mounting position information is written to each non-volatile memory by the writing device before the associated drive unit is installed in the vehicle, and the steering wheel position information is retrieved by the processor after the associated drive unit is installed in the vehicle.

4. The power window device according to claim 2, wherein the non-volatile memory is an EEPROM.

5. The power window device according to claim 1, further comprising:

a control unit for retaining the steering wheel position information, wherein the processor of each drive unit retrieves the steering wheel position information from the control unit.

6. The power window device according to claim 5, wherein the vehicle has an instrument panel including meters, and the control unit controls the meters of the instrument panel.

7. The power window device according to claim 1, further comprising:

a remote window switch operable for remotely raising and lowering the window member of a door from another door, the remote window switch being arranged on the door located closest to the steering wheel.

8. The power window device according to claim 1, further comprising:

a door window switch arranged in each door and being operable for raising and lowering the associated window member.

9. The power window device according to claim 1, wherein the processor determines whether the associated drive unit is mounted on a driver door or a passenger door based on the mounting position information and the steering wheel position information.

10. A method for installing a power window device in a vehicle including a steering wheel and a plurality of doors, with each door having a window member, wherein the power window device is for raising and lowering each window member, the method comprising the steps of:

mounting a plurality of drive units respectively on the plurality of doors for operating for raising and lowering the associated window members;

preparing memory devices respectively for the plurality of drive units;

retaining mounting position information, in each of the memory devices, of a position in the vehicle at which the window member driven by the associated drive unit is located;

preparing a plurality of processors connected to the associated memory devices respectively for the plurality of drive units;

retrieving steering wheel position information, with each of the processors, of whether the steering wheel is located on the right or left side of the vehicle; and recognizing the position in the vehicle at which the associated drive unit is installed with each of the processors based on the mounting position information and the steering wheel information.

11. The method according to claim 10, wherein the step of retaining mounting position information includes writing the mounting position information to each memory device with a writing device.

12. The method according to claim 10, wherein the step of retaining mounting position information is performed before the step of mounting a plurality of drive units, and the step of retrieving steering wheel position information is performed after the step of mounting a plurality of drive units.

13. The method according to claim 10, wherein the step of recognizing includes determining which one of the drive units is mounted on a driver door or a passenger door based on the mounting position information and the steering wheel position information.

* * * * *